(12) United States Patent
Reiner et al.

(10) Patent No.: US 10,118,376 B2
(45) Date of Patent: Nov. 6, 2018

(54) PROCESS FOR PRODUCING A THREE-DIMENSIONAL STRUCTURE

(71) Applicant: Nanoscribe GmbH, Eggenstein-Leopoldshafen (DE)

(72) Inventors: Roman Reinhard Reiner, Karlsruhe (DE); Yann Tanguy, Linkenheim-Hochstetten (DE); Joerg Hoffmann, Lustadt (DE)

(73) Assignee: NANOSCRIBE GMBH, Eggenstein-Leopoldshafen (DE)

( * ) Notice: Subject to any disclaimer, the term of this patent is extended or adjusted under 35 U.S.C. 154(b) by 253 days.

(21) Appl. No.: 15/140,898

(22) Filed: Apr. 28, 2016

(65) Prior Publication Data

US 2016/0332365 A1 Nov. 17, 2016

(30) Foreign Application Priority Data

May 13, 2015 (DE) .......................... 10 2015 208 852

(51) Int. Cl.
| | |
|---|---|
| *G05B 19/4099* | (2006.01) |
| *B29C 64/277* | (2017.01) |
| *B29C 64/135* | (2017.01) |
| *B33Y 10/00* | (2015.01) |
| *B33Y 80/00* | (2015.01) |

(52) U.S. Cl.
CPC ............ *B33Y 10/00* (2014.12); *B29C 64/135* (2017.08); *B29C 64/277* (2017.08); *B33Y 80/00* (2014.12); *G05B 19/4099* (2013.01); *G05B 2219/35134* (2013.01); *G05B 2219/49007* (2013.01)

(58) Field of Classification Search
CPC ... B33Y 10/00; B29C 64/135; G05B 19/4099; G05B 2219/49007; G05B 2219/35134
USPC .......................................................... 700/98
See application file for complete search history.

(56) References Cited

U.S. PATENT DOCUMENTS

| | | | |
|---|---|---|---|
| 4,575,330 A | 3/1986 | Hull | |
| 5,198,159 A | 3/1993 | Nakamura et al. | |
| 5,247,180 A | 9/1993 | Mitcham et al. | |
| 6,500,378 B1 | 12/2002 | Smith | |
| 8,676,735 B1 * | 3/2014 | Heidenreich | G06N 5/02 706/45 |
| 2003/0013047 A1 | 1/2003 | Tani | |
| 2005/0254130 A1 * | 11/2005 | Graf | E06B 9/24 359/604 |
| 2013/0060535 A1 * | 3/2013 | Fruth | B29C 67/0088 703/1 |

FOREIGN PATENT DOCUMENTS

| | | |
|---|---|---|
| DE | 4102260 | 7/1992 |
| EP | 2565018 | 3/2013 |

* cited by examiner

*Primary Examiner* — Ziaul Karim
(74) *Attorney, Agent, or Firm* — Volpe and Koenig, P.C.

(57) ABSTRACT

A method for producing a three-dimensional overall structure (18) by a structuring device (10a, 10b), which has a predefined principal direction (16) of the structure entry in a writing region (20). The overall structure (18) is defined by sequential definition of a plurality of partial structures (22) that complement one another overall to form the overall structure (18). The partial structures (22) are delimited in each case within enveloping interfaces (36). In this case, the partial structures (22) are chosen in such a way that the enveloping interfaces (36) extend obliquely with respect to the principal direction (16) of the structure entry.

6 Claims, 2 Drawing Sheets

PROCESS FOR PRODUCING A THREE-DIMENSIONAL STRUCTURE

INCORPORATION BY REFERENCE

The following documents are incorporated herein by reference as if fully set forth: German Patent Application No. 102015208852.9, filed May 13, 2015

BACKGROUND

The invention relates to a process for producing a three-dimensional structure.

Such structuring methods are used in particular for producing micro- or nanostructures, prototypes (e.g. so-called "rapid prototyping") or when producing workpieces having specific shape requirements, e.g. for experimental purposes and in areas in which great freedom of design is desired.

Structuring devices which have a predefined principal direction of the structure entry are often utilized in this case. The principal direction is generally predefined by constructional dictates, e.g. by the preferred direction of a structuring electron beam, by the optical axis of a laser optical assembly, by the direction of a material build-up beam of a 3D printer or by the mechanical spindle of a processing tool that is controllable in three spatial directions.

The structuring device generally also has a writing region that is delimited by constructional dictates. A structuring or a structure entry can be effected only in this delimited spatial region. In this case, the predefined writing region is often smaller than the overall structure to be produced overall. Therefore, in so-called "stitching methods" the entire structure is decomposed into a multiplicity of partial structures which match the writing region of the structuring device and are written successively.

Stereolithography methods are known from U.S. Pat. No. 4,575,330 A1 or U.S. Pat. No. 5,247,180 A, wherein a desired structure is built up from block-like partial structures or layer by layer in a bath of liquid lithography material (e.g. a photopolymer) by targeted exposure using a writing beam. For this purpose, the writing beam, by means of local exposure, in each case polymerizes structure blocks in a layer at the surface of the bath of lithography material with a desired pattern. By a carrier substrate being lowered step by step in the bath of lithography material, the structure is then built up layer by layer.

In this case, there is the problem that partial structures that have already been defined can disturb the introduction of a partial structure to be written subsequently. By way of example, in the case of block-like decomposition of the structure, individual sections of the structure blocks that have already been defined can shade or obstruct the writing beam during the definition of a following partial structure. This can lead to structuring faults. It is often necessary, therefore, to decompose the desired structure into a very large number of partial structures, which can lead to long process times for the decomposition into the partial structures and for the writing of the partial structures.

SUMMARY

The invention is based on the object of increasing the reliability and quality of the structuring in conjunction with the shortest possible process times.

This object is achieved by a method for 3D structuring including one or more features of the invention. The structuring is effected by a structuring device that is designed to perform a structuring in a generally constructionally predefined writing region in a manner concentrated around a predefined principal direction of the structure entry. The overall structure is thereby defined by sequential definition of a plurality of partial structures that complement one another overall to form the overall structure, wherein the sequentially written partial structures are delimited in each case by enveloping interfaces or are cut out from the overall structure by the enveloping interfaces. In this case, the partial structures are chosen in such a way that the enveloping interfaces run in an inclined fashion with respect to the principal direction of the structure entry, i.e. are not parallel to the principal direction or form a non-vanishing angle with the principal direction.

The partial structures that complement one another to form the overall structure can for example lie alongside one another in a planar fashion and/or also lie one above another in a layered fashion.

The principal direction of the structure entry is that direction or axis along which the structuring device acts substantially for defining the structuring in the writing region. The structuring can be effected e.g. in a suitable base material (e.g. lithography resist), or else by additive build-up of the structure using a material beam. In this regard, a lithography device, for example, has a writing beam that acts around an optical axis, such that the optical axis forms the principal direction of the structuring device designed as a lithography device. The writing beam can be for example a laser beam, ion beam or electron beam. In the case of a 3D printer or 3D plotter, a material entry is effected around a beam direction that in turn forms the principal direction of the structure entry. In principle, the method is also applicable to 3D milling or 3D drills in which the tool axis defines the principal direction of the structure entry.

The partial structures are determined, in particular, by the overall structure being decomposed into the partial structures and a respective partial structure being directly enveloped by the interface. The enveloping interfaces are in this respect in particular imaginary auxiliary surfaces for defining the partial structures. The partial structure is defined for example as a cutout from the overall structure that is bordered by the interfaces.

The enveloping interfaces of the partial structure run obliquely with respect to the principal direction of the structure entry such that partial structures that are already present are prevented from covering the structure entry along the principal direction. It is therefore possible to choose for the partial structure a depth that is comparatively large in terms of absolute value along the principal direction. Therefore, a decomposition into only a comparatively small number of partial structure blocks is necessary for producing the overall structure. This enables significantly shorter computation times for decomposing the overall structure into partial structures and shorter process times for writing the partial structures, without the structure quality and reliability of the structure production being impaired. Moreover, the lifetime of the structuring device can be increased since the required number of structuring operations overall can be reduced.

Preferably, for a respective partial structure, an interface demarcating the latter in a direction opposite to partial structures that are already present runs in such a way that the outer side of the partial structure that does not adjoin partial structures that are already present is visible without shading proceeding from the structuring device. For this purpose, it is conceivable, in particular, for the partial structures to be written sequentially one after another along a decomposition series, wherein the interface demarcating a selected partial structure in a direction opposite to the partial structures that are already present runs in such a way that the outer side of the partial structure that is formed by said interface faces the structuring device. In particular, it is advantageous if the surface normal to the interface (that is to say the outer side) delimiting a partial structure opposite to partial structures that are already present, outside the partial structure proceeding from the outer side considered, runs only toward the structuring device and not away from the latter.

Preferably, the partial structures are defined by the overall structure being decomposed by cuts with the enveloping interfaces. The enveloping interfaces are preferably designed in a plane fashion or comprised of plane sections, which enables a computationally simple decomposition. It is also conceivable, however, for the enveloping interfaces to have curved sections or to run in a curved fashion.

In principle, the decomposition of the overall structure into partial structures is preferably effected by software. In this respect, a data set (e.g. CAD data) representing the overall structure is provided and, if appropriate, is stored on a data carrier or a storage device of the structuring device. In particular, further data sets are determined therefrom in a computer-aided manner, said further data sets representing the partial structures, wherein the structuring device is driven in accordance with the data sets. Preferably, the data sets of the partial structures are determined in a computer-aided manner by cuts of the overall structure with the enveloping interfaces. In particular, a complete, overlap-free decomposition of the overall structure into the partial structures is effected by software.

Preferably, the decomposition is effected in such a way that adjacent partial structures along at least one enveloping interface touch one another. In this respect, a complete decomposition into partial structures is preferably effected. In this case, adjacent partial structures in each case can have at least one identical enveloping interface. After completion of the overall structure, therefore, the demarcating interfaces are no longer present as defined structures, but rather are completely integrated into the overall structure.

Preferably, the partial structures are determined in such a way that the enveloping interfaces, and in particular all possible tangential planes over the entire course of the enveloping interfaces, form an acute angle with the principal direction of the structure entry, said acute angle being open counter to the principal direction of the structure entry or being open toward the structuring device. The enveloping interfaces are oriented in particular in such a way that the outer side of a partial structure that is defined by an interface faces the structuring device at an acute angle.

In particular angles of greater than 0° and less than 45°, preferably between 5° and 20°, for example in the region of 15°, have proved to be advantageous.

Preferably, the partial structures are arranged in a decomposition grid and are written sequentially one after another, wherein in each case at least one enveloping interface of a partial structure runs parallel to at least one or a plurality of enveloping interfaces of other partial structures in the decomposition grid. In particular, it is conceivable for the enveloping interfaces of the partial structures that complement one another to form the overall structure to run parallel to one another in each case in pairs.

In order to write the partial structures sequentially, preferably, the writing region of the structuring device is displaced and positioned sequentially, wherein a partial structure is written in each case after displacement and positioning in the writing field. For displacing the writing region, either the structuring device can be displaced or a substrate can be displaced relative to the structuring device.

Preferably, the overall structure is produced by an energy irradiation method in a lithography material that is cross-linkable or polymerizable by energy input. In this case, the desired three-dimensional structure is defined in the lithography material by controlled and local polymerization by the energy beam and is hardened and/or uncovered by a possibly subsequent development step. In particular, the lithography material is hardenable by the energy input. It goes without saying, however, that from the outset it is also possible to use solid lithography materials which are polymerized by the energy input and the structuring is uncovered in a following development step. In its unpolymerized state the lithography material is preferably present in liquid form, in vicious form, in gel form or in solid form. By way of example, a lithography resist, in particular a negative resist, is used. Preferably, a photopolymerizable material is involved, for example a light-curing plastic that is polymerizable by the energy irradiation method, for example by a writing beam comprised of light, laser light, UV or the like.

Preferably, the lithography material is polymerized in a focus region of a writing beam of a radiation source of the structuring device, said focus region being spatially displaceable within the writing region. In this respect, the structuring device can preferably be a laser lithography apparatus, electron beam lithography apparatus or the like. For further configuration, a plurality of writing beams can act in the writing region, the focus regions of said writing beams jointly performing the structuring.

It is particularly preferred if the lithography material is polymerized by the mechanism of two-photon absorption or multi-photon absorption in the focus region of the writing beam. In this case, the lithography material is preferably designed in such a way, and the radiation source of the writing beam is preferably coordinated with the lithography material in such a way, that a polymerization is possible only by means of two-photon absorption or multi-photon absorption. For this purpose, by way of example, the wavelength of the writing beam can be chosen to be high enough (and the assigned quantum energy thus to be low enough) that the energy input required for the polymerization is achieved only by simultaneous absorption of the two or more quanta. The probability of such an absorption process is intensity-dependent and significantly increased in comparison with the rest of the writing beam in the focus region. In the context of basic considerations it emerges that the probability for absorption of two or more quanta may be dependent on the square or a higher power of the radiation intensity. In contrast thereto, the probability for the absorption of one quantum has a different intensity dependence, in particular with a lower power of the radiation intensity. When the writing beam penetrates into the lithography material, in principle a damping is additionally effected. In this regard, by way of example Beer's Law may apply to the decrease in intensity depending on the penetration depth into the lithography. This has the effect that a spatially resolving polymerization in a focus region deep below the surface of the lithography material with use of single-photon absorption would be problematic since, on account of the damping, even in the case of a focusing below the surface, in the focus region then present, the highest intensity is not necessarily present. The abovementioned mechanism of two-/multi-photon absorption enables a controlled structure definition also below the surface of the lithography material.

BRIEF DESCRIPTION OF THE DRAWINGS

The invention is explained in greater detail below with reference to the figures.

In the figures.

DETAILED DESCRIPTION OF THE PREFERRED EMBODIMENTS

In the following description and in the figures, in each case the same reference signs are used for identical or mutually corresponding features.

The schematically depicted illustration in FIGS. 1 to 4 shows in each case a structuring by polymerization of a lithography material (not illustrated in detail) by a corresponding writing beam. In principle, however, the method according to the invention can be applied to all structuring methods in which partial structures are written sequentially in a writing region and a principal direction for the structure entry is predefined.

Figure 1:
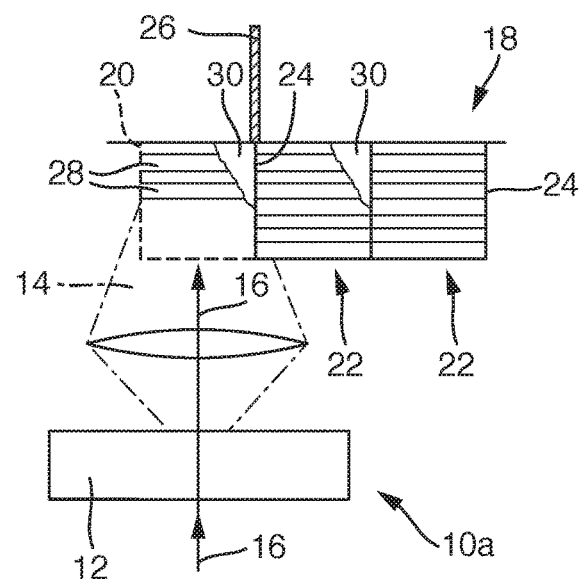
FIG. 1: shows a schematically depicted illustration for elucidating a 3D structuring method and the problems that occur in the process with a projecting structuring device.

FIG. 1 illustrates a first type of structuring device 10a, in which, by the use of a projection device 12, a writing beam 14 is emitted via a corresponding aperture around a principal direction 16 in the principal direction 16. The writing beam 14 has e.g. a spatial intensity variation that is designed for the definition of the desired structure.

The desired structure is designated overall by the reference sign 18 (overall structure) in FIGS. 1 to 4. Due to constructional dictates, the structuring device 10 has a spatially delimited writing region 20 within which a structuring can be effected, for example by the writing beam 14 (FIG. 1).

In the examples illustrated, the writing beam is radiated by way of example into a bath (not illustrated in more specific detail) of lithography material which is polymerizable and hardenable by the writing beam 14.

Figure 2:
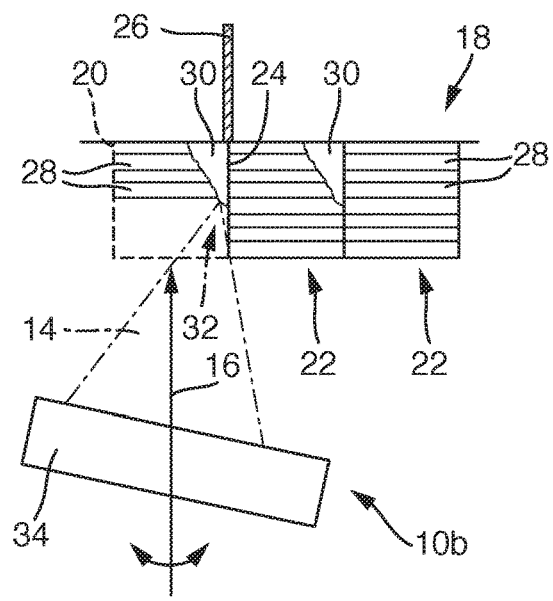
FIG. 2: shows an illustration corresponding to FIG. 1 with a beam directing structuring device.

Since the writing region 20 has a smaller spatial extent than the desired overall structure 18, the overall structure is decomposed into a plurality of partial structures 22, which, in the examples in accordance with FIGS. 1 and 2, are of block-wise design and are bordered by enveloping interfaces 24, which, in the case of FIGS. 1 and 2, extend parallel to the principal direction 16.

In order to produce the overall structure 18, the partial structures 22 are written sequentially one after another, e.g. in a decomposition grid (indicated in the figures) composed of partial structures 22 arranged alongside one another. For this purpose, the writing region 20 is displaced sequentially, for example by a substrate (not illustrated in more specific detail) being shifted relative to the structuring device 10 by a positioning device 26. Within the writing field 20, a partial structure 22 can for example in each case be built up in turn sequentially from layers 28, as indicated in FIGS. 1 to 4. For this purpose, by way of example, the substrate mentioned can be displaced step by step along the principal direction 16.

Since, in the example in FIG. 1, the writing beam 14 has a non-vanishing beam angle due to the aperture, sections of partial structures 22 that have already been written can lead to a shading of regions 30 in partial structures 22 that are respectively to be written. This shading in the regions 30 leads to incorrect structurings.

FIG. 2 shows a deviating method for structuring, in which a focus region 32 of the writing beam can be positioned and displaced in the writing region 20 in a controlled manner by a beam guiding device 34 (for example tilting mirror). For this purpose, a second type of structuring device 10b is provided. In this case, a scanning method, in particular, is employed. In this case, each of the successively written partial structures 22 can in turn be built up sequentially from layers 28.

In the case, too, of the scanning system depicted schematically in FIG. 2, the structure entry is effected around the principal direction 16 since the beam guiding device 34 can control the writing beam 14 around the principal direction 16 only within the writing region 20, such that the energy input is effected along the principal direction 16 on average over time and on average spatially.

In this case, too, the problem occurs that individual sections of the partial structures 22 that are already present shade the writing beam and, consequently, specific regions 30 in the writing field 20 are not accessible to the focus region 32.

Overall, therefore, in the case of the procedure in accordance with FIGS. 1 and 2, the partial structures 22 can have only a very limited extent along the principal direction 16, since otherwise the regions 30 would lead to unusability of the overall structure 18 produced.

Methods according to the invention for producing the three-dimensional structure 18 are explained with reference to FIGS. 3 and 4, structuring devices 10a (corresponding to FIG. 1) and/or 10b (corresponding to FIG. 2) being used. Therefore, with regard to the features of the structuring devices 10a and 10b, reference is made to the description concerning FIGS. 1 and 2.

For writing the overall structure 18, once again a plurality of partial structures 22 are defined sequentially by means of the writing beam 14. Each partial structure 22 is delimited by enveloping interfaces 36. In particular, the overall structure 18 is completely decomposed into partial structures 22, in particular in such a way that in each case adjacent partial structures 22 have a common enveloping interface 36.

In this case, in contrast to FIGS. 1 and 2, the enveloping interfaces do not run parallel to the principal direction 16 of the structure entry, but rather are oriented obliquely with respect to the principal direction 16.

Figure 3:
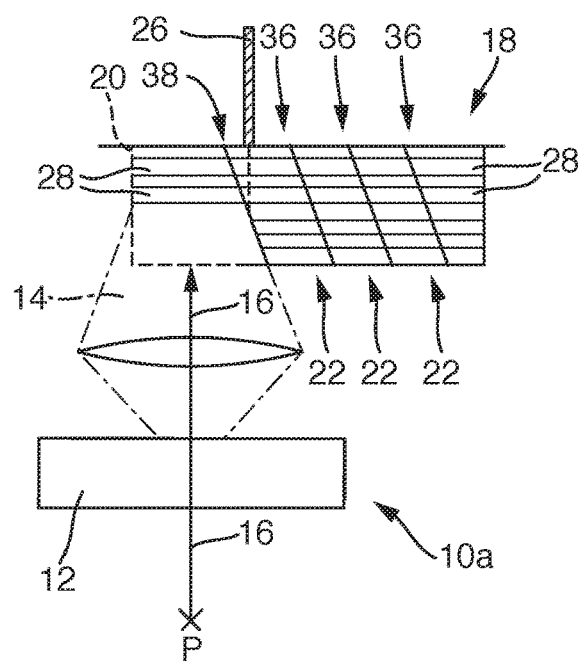
FIG. 3: shows a schematically depicted illustration for elucidating the method according to the invention with a projecting structuring device.

In the example in FIG. 3, all the enveloping interfaces 36 run substantially parallel to one another and are at an angle with respect to the principal direction 16 that is greater than or equal to the beam angle of the writing beam 14 (wherein the angle that is formed between principal direction 16 and interface 36 and opens in a direction counter to the principal direction 16 is considered here).

In the case of FIG. 3, this has the effect that, during the sequential writing of the partial structures 22, sections of partial structures 22 that are already present, in the writing region 20, are prevented from leading to shadings of the partial structure that is respectively to be written. In the case of FIG. 3, for example, this has the effect that the partial structures 22 can have a significantly greater extent along the principal direction 16 in comparison with FIG. 1.

Figure 4:
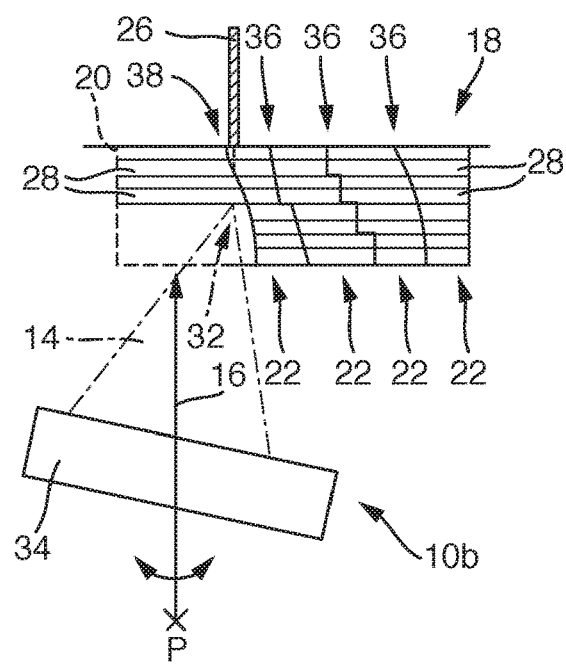
FIG. 4: shows a schematically depicted illustration for elucidating the method according to the invention with a scanning structuring device.

In the case, too, of FIG. 4 using a scanning system (corresponding to structuring device 10b, cf. FIG. 2), the interfaces 36 that in each case delimit the partial structures 22 to be written sequentially run obliquely with respect to the principal direction 16.

In principle, the interfaces 36 can in particular also have more complex configurations than simple planes, for example differently inclined planes adjacent to one another section by section and/or regions running in a curved fashion section by section (cf. FIG. 4). What is crucial here, too, is that shading by partial structures 22 that are already present within the writing region 20 is avoided on account of the (locally) inclined course of the interfaces 36 with respect to the principal direction 16.

As is evident in FIGS. 3 and 4, the enveloping interfaces 36 here run in each case in such a way that the line of sight from each section of the writing region 20 counter to the principal direction 16 is not shaded. In this respect the interfaces 36 for the partial structures 22 form in each case outer sides 38 of the partial structures 22 already present which completely face a viewing point P spaced apart counter to the principal direction 16 and are freely visible from said viewing point.

The invention claimed is:

1. A method for producing a three-dimensional overall structure (18) by an energy irradiation method in a lithography material that is structurable by energy input via a structuring device (10a, 10b), which has a predefined principal direction (16) of the structure entry in a writing region (20), the method comprising:
   writing the overall structure (18) by sequential writing of a plurality of partial structures (22) that complement one another overall to form the overall structure (18),
   delimiting the partial structures (22) in each case within enveloping interfaces (36), and
   writing the partial structures (22) such that the enveloping interfaces (36) run obliquely with respect to the principal direction (16) of the structure entry,
   wherein the lithography material is polymerized by two-photon absorption or multi-photon absorption in at least one focus region (32) of at least one writing beam (14), said at least one focus region is spatially displaceable within the writing region (20), and
   wherein the interface (36), which borders a respective partial structure (22) in a direction opposite to partial structures (22) that are already present, is running such that said interface (36) forms an outer side (38) of the partial structures and the outer side (38) is completely visible from a viewing point (P) spaced apart opposite to the principal direction (16), the method further comprising:
   providing a data set representing the overall structure (18), and determining further data sets therefrom in a computer-aided manner, said further data sets representing the partial structures (22), and controlling the structuring device (10a, 10b) in accordance with the data sets.

2. The method as claimed in claim 1, wherein the partial structures (22) are demarcated by cuts of the overall structure (18) with the enveloping interfaces (36).

3. The method as claimed in claim 1, wherein adjacent ones of the partial structures (22) in each case have at least one identical one of the enveloping interfaces (36).

4. The method as claimed in claim 1, wherein the enveloping interfaces (36) form an acute angle with the principal direction (16) of the structure entry, said acute angle being open opposite to the principal direction (16).

5. The method as claimed in claim 1, further comprising: arranging the partial structures (22) in a decomposition grid and in each case at least one of the enveloping interfaces (36) of one of the partial structures (22) extends parallel to at least one of the enveloping interfaces (36) of a further one of the partial structures (22).

6. The method as claimed in claim 1, further comprising, for sequentially writing the partial structures (22), displacing the writing region (20) of the structuring device (10a, 10b) sequentially and writing one of the partial structures (22) in each case in the writing field (20).

\* \* \* \* \*